E. A. HAILWOOD.
SAFETY LAMP.
APPLICATION FILED AUG. 11, 1914.

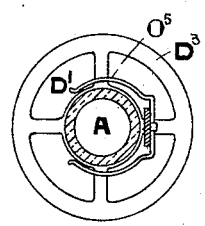
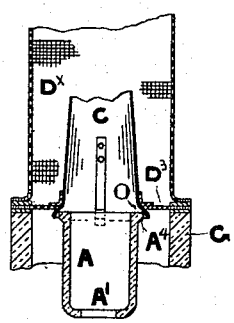
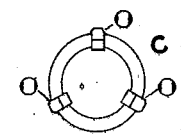
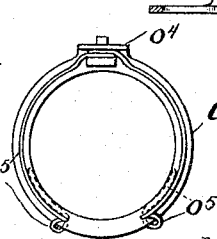

1,212,631. Patented Jan. 16, 1917.
2 SHEETS—SHEET 2.

Fig.17.

WITNESSES:
John C. Sanders
Albert F. Heuman

INVENTOR:
Ernest Arthur Hailwood
BY Wm Wallace White
ATT'Y

UNITED STATES PATENT OFFICE.

ERNEST ARTHUR HAILWOOD, OF CHURWELL, NEAR LEEDS, ENGLAND.

SAFETY-LAMP.

1,212,631.  Specification of Letters Patent.  Patented Jan. 16, 1917.

Application filed August 11, 1914. Serial No. 856,168.

*To all whom it may concern:*

Be it known that I, ERNEST ARTHUR HAILWOOD, a subject of the King of Great Britain and Ireland, residing at The Towers, Laneside, Churwell, near Leeds, in the county of York, England, have invented new and useful Improvements in Safety - Lamps, of which the following is a specification.

This invention relates to miners' safety or like lamps.

My objects are to introduce such improvements and modifications as will enable a lamp to give considerably increased illumination, and yet will not interfere unduly with the existing devices such as means for electric re-lighting.

My invention may be readily applied to existing patterns of lamp and is easy to manipulate and to clean, and comparatively cheap in upkeep, and does not interfere with gas detecting, but is more likely to intensify gas caps or flow, and facilitates gas detecting. The lamp is not readily extinguished by jerking. For the purpose of future reference I term the combined means a combustion tube.

In describing my invention in detail reference is made to the accompanying sheets of drawings wherein as far as convenient similar letters indicate similar parts in which—

Figure 1 represents a view of a lamp fitted with a "combustion tube," the upper portion being in section, showing one method of carrying out my invention. Fig. 2 is a horizontal sectional view through the inner glass and looking upwardly, certain of the parts being omitted. Fig. 3 is a bottom plan of the bracket for supporting the inner glass, the latter being indicated in dot and dash lines. Figs. 4 and 5 represent sectional elevation and a plan view respectively showing another method of suspending the inner glass. Figs. 6 and 7 represent sectional elevation and inside elevation respectively of a portion of the chimney showing a spring suspension means for an inner glass. In Fig. 7 part of the bracket O' is not shown. Fig. 8 represents another form of suspension means and a carrier for the glass, in sectional elevation. Fig. 8$^A$ is a fragmentary detail inside elevation. Fig. 8$^B$ is a fragmentary detail in slant view. Fig. 9 represents a side elevation of the glass carrier shown in Fig. 8. Figs. 10 and 11 represent further forms of glass or carrier suspension means. Fig. 12 represents views of chimney base and carrier (plans) showing a bayonet joint attachment. Figs. 13, 13$^A$, 14, 15 and 16 represent further forms of glass or like carrying devices attached to a chimney. Fig. 17 represents a detail of a washered flange for carriers or gauzes, disks or supporting rings, hereinafter referred to. Fig. 18 represents a sectional elevation showing a double gauze, an inner glass, and centralizing means for the glass. Fig. 19 represents a further form of inner glass suspending means. Fig. 20 represents a plan of an inner glass carrier. Fig. 21 represents an elevation of another form of glass carrier. Figs. 22 and 23 represent plans of further forms of inner glass or like carrying means. Fig. 24 represents an end view showing a spring means between the chimey and glass carrying device to allow for adjustment or centralization of the glass. Fig. 25 represents a view of an outer gauze provided with a locating flange.

In carrying out my invention in one form as in Fig. 1, I provide the lamp with a chimney C of suitable material such as metal or glass, this chimney being somewhat similar to the Mueseler chimney or tube, and having attached thereto a curved coned or stepped up gauze disk such as D, or a stiffening or supporting ring or plate D$^3$ the flange of which rests on or above the ordinary cylindrical lamp glass G, spaces D' being formed in the gauze carrying flange as shown in Fig. 2. Underneath the chimney C I suspend or support an inner glass A preferably of cylindrical form terminating in or resting upon a base A$^3$ some little distance above the lamp wick tube W and such base is provided with a combustion aperture A' through which the flame F may pass; incoming air impinging upon the flame hereabout.

In all of the forms illustrated the burners and the flame therefrom are so disposed that the flame extends through the reduced combustion aperture A' of the inner glass tube A.

The inner glass A may be attached to the chimney C in many ways some examples of which are hereinafter given. In the form shown in Fig. 1 a bracket A$^2$ (or brackets) is suitably attached to the chimney C and leads downward and terminates in a flange or base A$^3$ (Figs. 1 and 3) provided with a combustion aperture A', and from the bracket A$^2$ is carried a spring clip such as O$^5$ (Figs. 1 and 2), the glass in this form being abstracted or inserted in a horizontal plane and being retained between the base of chimney C and the flange $A^3$, and I have found that the joint so made is sufficiently good for the purpose. The bracket $A^2$ and base $A^3$ may be made from spring material in such a manner that $A^3$ inclines upward and tends to grip the glass; the kink $A^9$ in the brackets and base gives a spring effect and at the same time makes the device rigid. To further assist base $A^3$ in holding up the glass, additional springs may be placed behind the kink, or may be attached to the sides or front of the base $A^3$ and the bracket $A^2$ or to the ring or like $D^3$. An outer gauze $D^x$ is provided between the chimney C and lamp hood H. The chimney C may be open at the top or provided with a cowl $C'$ as shown for the purpose of protecting the gauze $D^x$, said cowl being pivoted or hinged or pivoted and hinged to enable its being readily moved on one side for cleaning purposes. A baffle ring $C^2$ may fit around the chimney C in any convenient position to baffle the air going into the lamp. For the purpose of simplification of the sketches the metal chimney C is not in every form herein described and shown surrounded by the ordinary outer gauze $D^x$, nor is a gauze sleeve or flange shown combined with such chimney, but in the application of the device hereinbefore and after described such gauzes may be employed when necessary.

In Fig. 4 the inner glass A is retained or suspended by means of spring arms or clips O attached to chimney C on the inside as shown in Fig. 4 a plan of the clips being shown in Fig. 5, the glass A having a flange such as $A^4$ and terminating in a base having an opening or aperture $A'$. This or any of the chimneys C may carry a curved gauze as shown in Fig. 1 or a flat flange or disk of gauze $D^3$ as shown in Fig. 4.

In Figs. 6 and 7 are shown brackets $O'$ attached to chimney C carrying springs $O^2$ adapted to act against flange $O^3$ of brackets $O'$ and so retain a flanged inner glass or carrier for same between the spring and flange.

In Figs. 8 and 9 are shown chimney C, a gauze $D^4$, in this case turned downward, and an arm or bracket $O^4$ carrying a wire spring clip $O^5$ having its upper arm turned up and over the flange of chimney C as shown by dotted lines in Fig. 8. This clip may be adapted to carry either a plain or flanged glass or a carrier such as $A^x$ (Figs. 8 and 9) in which a cylindrical inner glass may be seated, the glass and carrier in this form being inserted in a horizontal direction into the arms of clip $O^5$.

Figure 14:
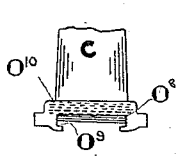

In Fig. 14 the chimney C is provided with an outer slidable flange or clip member $O^8$ having a recessed opening $O^9$ for the reception of the flange of an inner glass or carrier for same, a spring $O^{10}$ as shown by dotted lines pressing the lower part of the flange $O^8$ upward and consequently gripping the flange of the glass or glass carrier.

Figure 15:
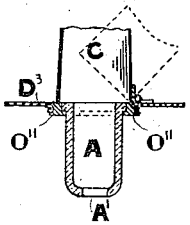

In Fig. 15 the chimney C has hinged thereto a recessed cradle or ring $O^{11}$ for the reception of a flanged inner glass or carrier for same, and such ring may have an outer flange to which the gauze flange or like such as $D^3$ may be attached as shown, such as by securing in the said outer flange.

Figure 16:
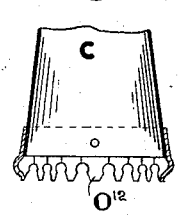

In Fig. 16 is shown a chimney C provided with a serrated flange $O^{12}$, the serration forming a clip to retain an inner glass or carrier.

Fig. 17 is a detail of a permanent jointing washer to be attached to or form part of the gauze disk, such as $D^3$ or other forms shown, and such washer will be attached to the edge of the gauze where same comes between the outer glass G and middle ring M, or flange of gauze $D^x$. This washer may be in one piece doubled over and cemented, clenched, or "formed" on the gauze edge and may be made from suitable raw material, baked or otherwise treated. This obviates the necessity for loose washers. The washer may be double, that is top and bottom as shown, or may be at the upper or under sides of the gauze only.

In a modified form I may attach to the inner glass A a ring such as $D^3$ (Fig. 2) and retain the glass in position by resting the ring $D^3$ on the outer glass G.

Figure 18:
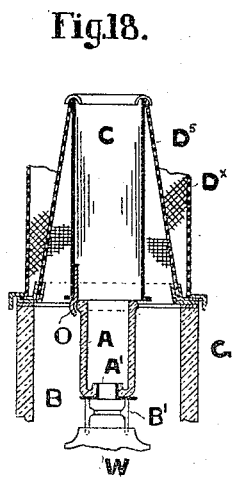

In Fig. 18 I show a chimney C surrounded by a gauze $D^5$, the two being by preference flanged together at the top, the usual outer gauze $D^x$ is also shown. The inner glass A is suspended by any suitable means such as those before described, a clip O being shown, and to provide means for locating securing and insuring the glass or combustion aperture A′ being in a correct central position I employ a fitting having a flanged ring B adapted to carry or form the aperture A′ in the inner glass and side arms or the like B′ adapted to embrace the sides of the wick tube W as shown. The flanged ring B may be made large enough to seat or enter the whole of the base of the glass A.

Instead of fitting the centralizing device B on to the sides of the wick tube I may provide same with arms or pillars continuing downward and terminating in a flange which may be seated in the lamp body and be suitably secured in position. The whole is such as to interfere as little as possible with the free access of air to the combustion aperture A′.

Figure 19:
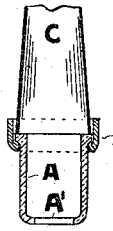

In Fig. 19 the chimney C may be secured to the glass carrier by being sprung or screwed into a recessed carrier or cradle $A^5$ in which may rest the glass A.

Figure 20:
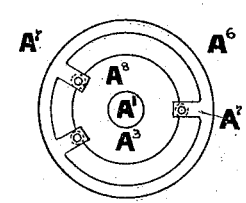

In Fig. 20 plan, the carrier $A^6$ is in the form of a ring adapted to be seated on the outer glass G or washers thereon and has inner projecting arms $A^7$ carrying pillars $A^8$ which in turn carry the base $A^3$ on which the glass will rest, the view shown is a plan looking to the base $A^3$.

Figure 13:
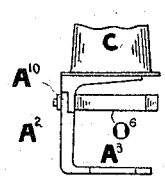
Fig. 13 shows a bracket $A^2$ somewhat similar to that in Figs. 1, 2, and 3 carrying a band spring clip $O^6$ the lower portion of the bracket being attached to the outer by a suitable joint as shown at $A^{10}$, or the bracket $A^2$ may be attached to the chimney in the manner shown with reference to Fig. 1. Fig. $13^A$ shows plan of band spring clip $O^6$ with gap for insertion of the glass.
Figure 21:
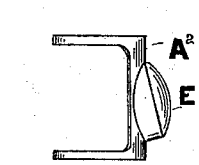

In Fig. 21 is shown a carrier similar to that shown in Fig. 1 or 13 having its bracket $A^2$ provided with a bulls eye or lens E slightly tilted upward. This or any of the forms of carrier may be made out of spring material and the inner glass may be sprung into position therein and in some forms I may place a spring clip nearer to the base than to the chimney.

Figure 22:
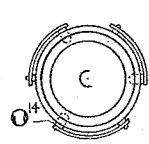

In Fig. 22 is shown in plan a chimney C provided with a flange $O^{13}$, provided with spring projecting pieces $O^{14}$ adapted to yield as an inner glass or carrier engages them and then spring back to their normal position and so retain the glass or carrier.

Figure 23:
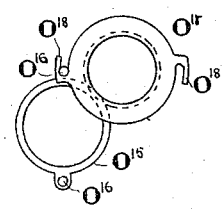

In Fig. 23 is shown in inverted plan a chimney C having a flange $O^{15}$ carrying, securing, and pivoted studs $O^{16}$ which engage a recessed ring $O^{17}$ provided with securing projections $O^{18}$, the ring $O^{17}$ being shown turned away from the chimney on one of the studs $O^{16}$.

Figure 10:
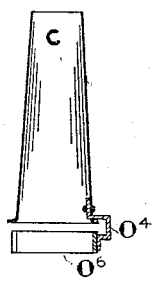
Fig. 10 shows a chimney C provided with a band spring clip $O^6$ which may be open at one side to receive the inner glass and carried from an arm or bracket $O^4$ which may be attached to the chimney on the outside as in Fig. 8, or on the inside as in Fig. 10, or the bracket $O^4$ may carry a spring clip similar to $O^6$ which will embrace the chimney C.
Figure 11:
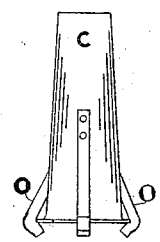
Fig. 11 shows a form of clip arms O similar to that shown in Fig. 4 except that the clips are attached to the chimney C externally. The clips are long so as to give plenty of elasticity, and this same remark applies to springs O in Fig. 4.
Figure 12:
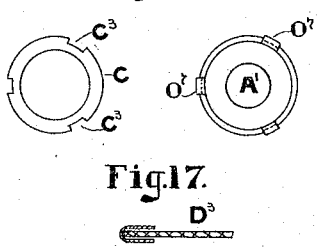
Fig. 12 shows a form of bayonet joint (in plan) recesses $C^3$ being formed in the flange of chimney C for the reception of upstanding undercut locking catch members $O^7$ carried from a carrier such as $A^x$, such catches being passed into the recesses $C^3$, the carrier being then given a turn until the catches engage the flange of the chimney.
Figure 24:
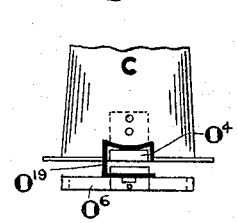
Figure 13A:
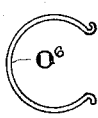

In Fig. 24 (end view) is shown a chimney carrying a bracket $O^4$ as in Fig. 10, but this bracket is not directly connected to the bracket or other portion which carries the band clip or like $O^6$, the connection being made by means of a spring $O^{19}$ attached to the band clip or a projection on same and bearing down on the bracket $O^4$ which will permit of the centralization or horizontal sliding adjustment of position of the band clip or glass or carrier.

In place of gauze disk D Fig. 1 I may substitute a supporting ring or the like such as $D^3$ only.

Coning up or stepping the gauze disk has the effect of allowing a greater quantity of air to pass into the lower part of the lamp than is possible with a flat gauze disk in a lamp of the same size.

To increase the lighting effect and for insulation purposes I may silver or enamel the inner glass in the usual or any preferred way or process employed for this purpose, where desirable, as also may I silver or enamel the depending bracket, pillars or inner glass carriers or any metal near the flame.

It will be noted that the inner glass may take various forms and may be a plain cylinder having an insertible glass or metal base with a reduced aperture A′ thereon, or the said aperture may be formed in the glass itself. The glass may be flanged to form suspension means with the spring or other fittings, and the base of the glass and aperture A′ will be suspended in such a position above the wick tube or flame as to give the maximum candle power, the increase over that of ordinary lamps being enormous. I have shown many forms of apparatus, suspension means forms of gauzes, flanges, clips, carriers or the like, yet I wish it to be understood that I may construct, combine or assemble the parts in other combinations than those shown, provided that in all cases an inner suspended glass is employed.

Figure 25:
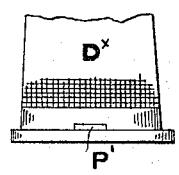

To insure the combustion tube device always being in the most favorable position in the lamp viz. so that the flame rays are not blocked out by one of the lamp strops or pillars I provide a projection or a recess P′ (Fig. 25) on the flange of the outer gauze $D^x$ which enters a corresponding projection or recess in the middle ring or the like. The combustion tube would take up a definite position according to position of projection on the outer gauze or I may provide the flanges of the combustion tube or its parts with similar projections or recesses to enter the outer gauze or middle ring.

To protect the air inlets at the middle ring M from strong currents or winds I provide a guard plate such as M′, see Fig. 1.

By the term "combustion aperture," I mean throughout the specification, an aperture through which the flame passes in the base piece of the inner glass, the cross sectional area of the aperture being substantially less than that of the inside of the inner glass.

What I claim is:—

1. In miners' safety lamps, a chimney, an inner glass suspended therefrom by means of a framework having a base piece in which a combustion aperture is formed, said framework having a spring acting kink at one side adapted to form a spring suspension for the inner glass.

2. In a miner's safety lamp, the combination with the usual lamp burner, outer glass supported thereon, inner metallic chimney, gauze covering over the same and hood connected to said lamp body and disposed over the chimney and gauze; of an inner glass suspended from the chimney, said inner glass having a reduced opening in its base below which the burner of the lamp is located to permit the flame to extend through said opening and also to permit the entrance of air thereto for combustion.

3. In combination with a lamp having an outer glass, a burner and a chimney, an inner glass interposed between the chimney and the burner, a framework carried by the chimney and extending downward, and a plate carried by the framework extending under the inner glass and provided with an aperture of less dimension than the inner glass and so arranged that the flame from the burner may extend therethrough.

4. In combination with a lamp having a burner, an outer glass disposed around the burner, a chimney disposed above the burner, a gauze mantle disposed around the lower end of the chimney, an inner glass disposed between the lower end of the chimney and a point above the burner, resilient means carried by the chimney and extending underneath the inner glass and provided with an aperture of a size smaller than that of the inner glass and so arranged above the burner that the flame therefrom may enter the aperture.

In testimony whereof I have signed my name to this specification in the presence of two subscribing witnesses.

ERNEST ARTHUR HAILWOOD.

Witnesses:
   CLIVE WAUGH,
   FRANK TATE.

Copies of this patent may be obtained for five cents each, by addressing the "Commissioner of Patents Washington, D. C."